United States Patent
Li (10) Patent No.: US 10,759,319 B2
(45) Date of Patent: Sep. 1, 2020

(54) COLLAPSIBLE SEAT ASSEMBY

(71) Applicant: HONDA MOTOR CO., LTD., Minato-ku, Tokyo (JP)

(72) Inventor: Yimeng Li, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 16/232,817

(22) Filed: Dec. 26, 2018

(65) Prior Publication Data

US 2020/0207247 A1 Jul. 2, 2020

(51) Int. Cl.
*B60N 2/90* (2018.01)
*B60N 2/68* (2006.01)
*B60N 2/66* (2006.01)
*B60N 2/30* (2006.01)

(52) U.S. Cl.
CPC ........... *B60N 2/914* (2018.02); *B60N 2/3038* (2013.01); *B60N 2/665* (2015.04); *B60N 2/68* (2013.01)

(58) Field of Classification Search
None
See application file for complete search history.

(56) References Cited

U.S. PATENT DOCUMENTS

| | | | | |
|---|---|---|---|---|
| 3,899,797 | A | * | 8/1975 | Gunst ...................... A47C 4/54 5/655.3 |
| 4,778,216 | A | * | 10/1988 | Stupakis .................. A47C 3/40 248/157 |
| 5,879,053 | A | | 3/1999 | Lux et al. |
| 6,912,748 | B2 | | 7/2005 | Vansickle |
| 7,347,477 | B2 | | 3/2008 | Carty |
| 8,235,445 | B2 | | 8/2012 | Jones et al. |
| 8,944,504 | B2 | | 2/2015 | Zimmerman, II |
| 9,016,778 | B2 | | 4/2015 | Hellman et al. |
| 9,061,765 | B2 | | 6/2015 | Vazquez et al. |
| 9,610,872 | B2 | | 4/2017 | Dry et al. |
| 9,981,588 | B2 | | 5/2018 | Dry et al. |
| 2012/0313409 | A1 | * | 12/2012 | Michalak ................. B60N 2/56 297/216.1 |
| 2014/0021755 | A1 | | 1/2014 | Oates et al. |
| 2016/0236601 | A1 | * | 8/2016 | Dry ....................... B60N 2/914 |
| 2017/0043690 | A1 | | 2/2017 | Dry et al. |
| 2018/0105076 | A1 | | 4/2018 | Dry |
| 2018/0105080 | A1 | | 4/2018 | Dry |
| 2018/0134186 | A1 | * | 5/2018 | Mizuno .................... B60N 2/26 |

FOREIGN PATENT DOCUMENTS

| | | |
|---|---|---|
| CN | 204309625 U | 5/2015 |
| DE | 102008052480 B4 | 4/2011 |
| DE | 10355519 B4 | 7/2013 |
| FR | 2982208 B1 | 12/2013 |

* cited by examiner

*Primary Examiner* — David E Allred
(74) *Attorney, Agent, or Firm* — Arent Fox LLP (57) ABSTRACT

A collapsible seat assembly includes one or more pneumatic bladder members providing, in an inflated state, at least a base portion and a seatback portion of the collapsible seat assembly, and a plurality of internal rigid frame members disposed at least partially within the one or more pneumatic bladder members. At least a portion of the one or more pneumatic bladder members can attach to at least a portion of the plurality of internal rigid frame members to provide a support for the one or more pneumatic bladder members.

22 Claims, 8 Drawing Sheets

COLLAPSIBLE SEAT ASSEMBY

BACKGROUND

The subject matter disclosed herein relates to vehicle seating and, more particularly, to a collapsible seat assembly and/or a corresponding method of operation.

Conventional passenger vehicles include driver-side and passenger-side front seats and/or one or more rows of rear seats oriented facing a normal forward direction of travel. Vehicle seats are generally composed of a frame structure and attached fabric providing a base portion and a seatback portion. The fabric can provide comfort for sitting in the seat. Conventional vehicle seats are relatively heavy, given materials used in the frame structure and attached fabric portions. Additionally, conventional vehicle seats are intended to remain in, and attached to, the vehicle. Though some vehicle seats having a sliding action to allowing moving the vehicle seat within the vehicle (e.g., forward and backwards), typically vehicle seats are not completely moveable/removable, and as such weight may not be a concern for conventional vehicle seats. Moreover, the advent of autonomous driving may lead to more flexibility in vehicle interior design.

SUMMARY

The following presents a simplified summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In one example, a collapsible seat assembly is provided that includes one or more pneumatic bladder members providing, in an inflated state, at least a base portion and a seatback portion of the collapsible seat assembly, and a plurality of internal rigid frame members disposed at least partially within the one or more pneumatic bladder members. At least a portion of the one or more pneumatic bladder members can attach to at least a portion of the plurality of internal rigid frame members to provide a support for the one or more pneumatic bladder members.

In another example, a method for operating a collapsible seat assembly is provided. The method includes deflating one or more pneumatic bladder members providing at least a seatback portion of the collapsible seat assembly to a deflated state, and collapsing one or more internal rigid frame members disposed within the one or more pneumatic bladder members to a collapsed state.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "pneumatic bladder member," as used herein may include an air-tight structure composed of a material to support human body weight applied to the pneumatic bladder member when inflated. In an example, the pneumatic bladder member may have an associated mechanism to control inflation/deflation thereof, such as an air compressor.

An "internal rigid frame member," as used herein may include one or more supports composed of a rigid material, such as one or more metals, plastic, composite, combinations thereof, etc. and may be at least partially internal to one or more pneumatic bladder members. The rigid materials may be of substantially lighter weight than convention frame members for seat assemblies to allow for simplified transport of a collapsible seat assembly. An internal rigid frame member may or may not have a folding or collapsing action.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

In an aspect, the present disclosure includes a collapsible seat assembly comprising one or more pneumatic bladder members to provide at least a base portion and seatback portion of the seat when inflated, and a plurality of internal rigid frame members that can provide a collapsing action to facilitate collapsing the seat assembly at least when the one or more pneumatic bladder members are in a deflated state. For example, the internal rigid frame members may be disposed at least partially within some of the one or more pneumatic bladder members. In the described configuration, the one or more pneumatic bladder members can also provide a level of support for a body seated in the seat assembly, which may allow for using less and/or lighter materials for the internal rigid frame members. Additionally, the one or more pneumatic bladder members can be composed of lightweight materials. In this regard, using the collapsible seat assembly described herein in a vehicle can result in a lighter weight seat assembly than fabric seats conventionally used in vehicles, though the use of the collapsible seat assembly described herein may not be limited to vehicles. In addition, using collapsible seats can bring more flexibility to vehicle interior configuration by allowing simplified movement, addition, removal, etc. of seat assemblies within the vehicle interior. Moreover, the one or more pneumatic bladder members can provide increased flexibility in seat adjustment, which may include but may not be limited to back support, lumbar support, headrest position, etc. For example, the one or more pneumatic bladder members can allow for (e.g., by inflating/deflating bladder members) functional changes to the seat assembly, such as a wider but open seat for luxury feel, a tight deep seat for a sporty feel, etc.

Additionally, one or more of the plurality of internal rigid frame members may be collapsible such to collapse the seat assembly when the one or more pneumatic bladder members are in a deflated state. For example, a given internal rigid frame member may have a collapsing action such that a portion of the internal rigid frame member collapses over itself to shorten or extend. Allowing collapsing of the internal rigid frame member in this regard can lessen the size of the seat assembly, which may facilitate easier transport of the seat assembly. In addition, in one example, the seat assembly may include a strap that can at least one of retain the seat assembly in a collapsed state and/or facilitate collapsing the internal rigid frame members, deflating the one or more pneumatic bladder members, etc.

Figure 1:
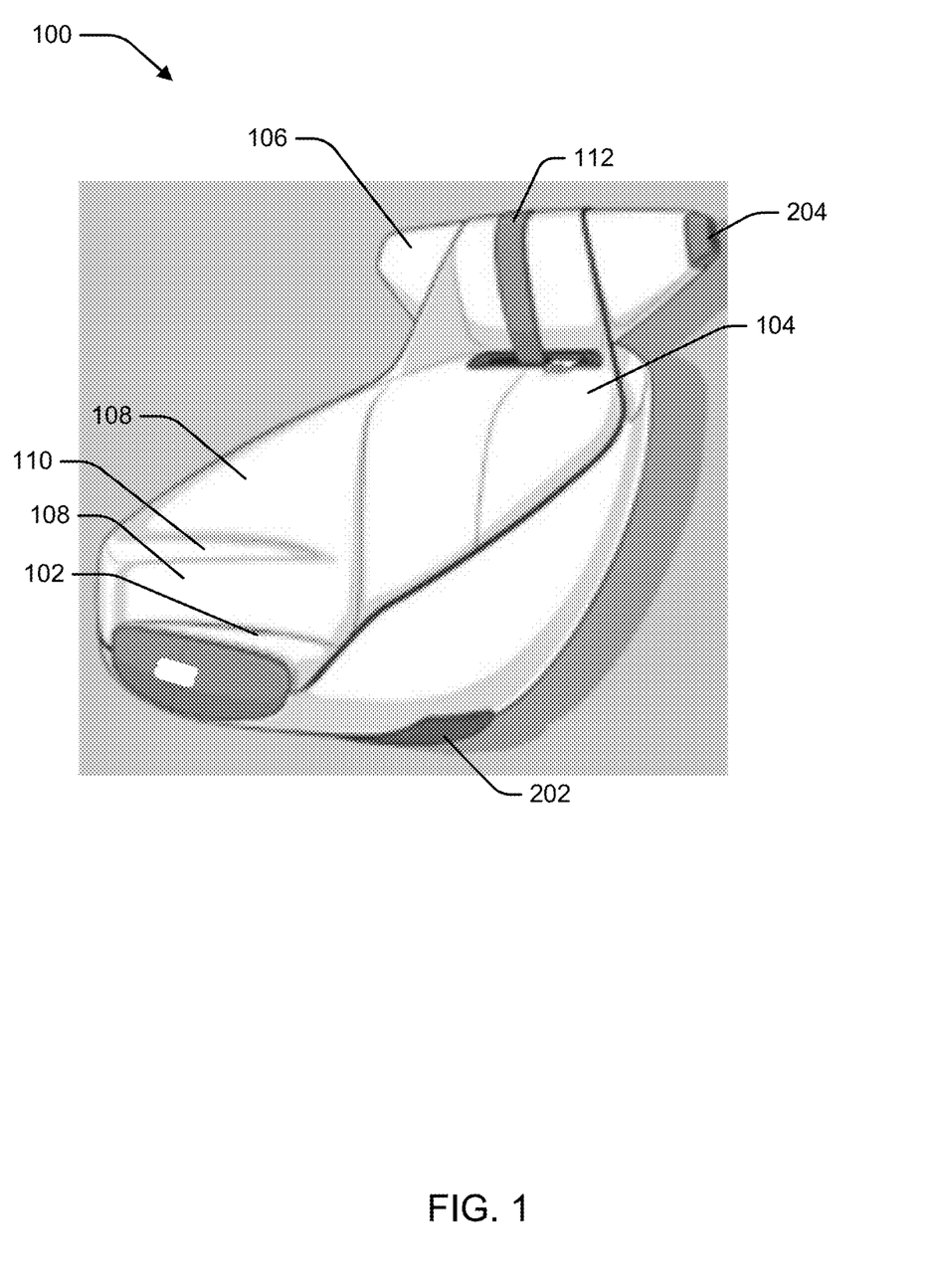
FIG. 1 illustrates a perspective view of an example of a collapsible seat assembly in accordance with aspects of the present disclosure.

FIG. 1 illustrates a perspective view of an example of a collapsible seat assembly 100 in an inflated state in accordance with aspects described herein. The collapsible seat assembly 100 can include one or more pneumatic bladder members to provide various portions of the collapsible seat assembly 100 described herein, such as a base portion 102 and a seatback portion 104, which may support a body of a person when sitting in the collapsible seat assembly 100, a headrest portion 106, one or more side panel portions 108, armrests 110, etc. In one example, one pneumatic bladder member can provide the various portions 102, 104, 106, 108, 110, while in other examples multiple pneumatic bladder members may be used to provide one or more of the portions 102, 104, 106, 108, and/or 110, as described further herein. The base portion 102 and seatback portion 104 may include, or be composed of, one or more pneumatic bladder members that can have an inflated state and a deflated state. FIG. 1 illustrates the collapsible seat assembly 100 with the pneumatic bladder members that comprise the base portion 102 and seatback portion 104 in the inflated state. In the inflated state, the base portion 102 and seatback portion 104 can provide support for a person sitting in the collapsible seat assembly 100. In this regard, the one or more pneumatic bladder members that form the base portion 102 and the seatback portion 104 can be air tight to allow for retaining air in the inflated state. In addition, the one or more pneumatic bladder members that form the base portion 102 and the seatback portion 104 can be composed of materials that are strong enough to provide load bearing support for people at least according to a specific weight limit. Examples of such materials may include carbon fiber or other composites, one or more metals, plastic, combinations thereof, etc., and may include a bistable spring or mechanism similar to a tape measure or slap bracelet.

In addition, the collapsible seat assembly 100 may include a headrest portion 106, which may further include one or more pneumatic bladder members to provide head support when in an inflated state. The collapsible seat assembly 100 may also include one or more side panel portions 108, which may further include one or more pneumatic bladder members. The one or more side panel portions 108 may provide support to a hip or side area of the person and/or may include a top portion for an armrest 110. The collapsible seat assembly 100 may also include a strap 112 that can facilitate operating the collapsible seat assembly 100 to cause deflation and/or inflation of the one or more pneumatic bladder members and/or to collapse certain internal rigid frame members, as described further herein.

Figure 2A:
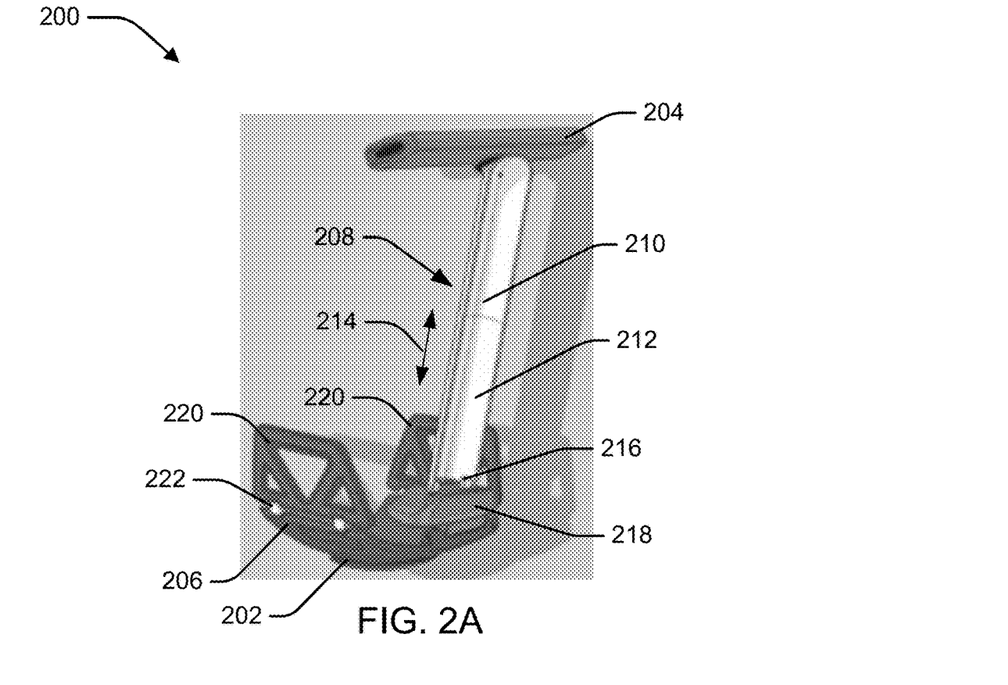
FIGS. 2A and 2B illustrate a perspective view and side view of an example of one or more internal rigid frame members of a collapsible seat assembly in accordance with aspects of the present disclosure.
Figure 2B:
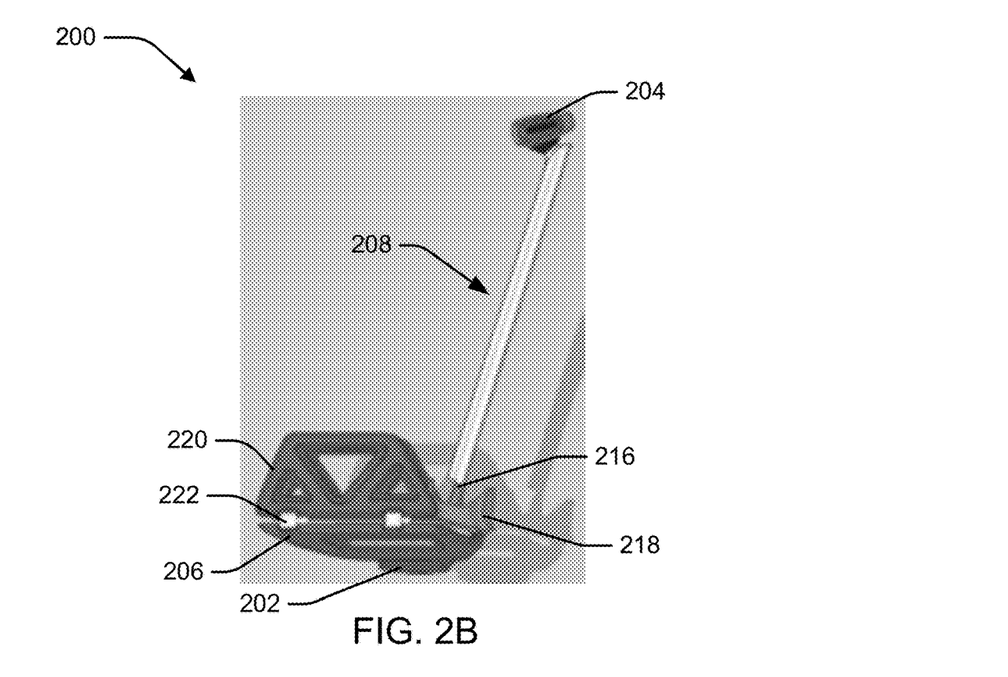

FIG. 2A illustrates a perspective view of a frame structure 200 for the collapsible seat assembly 100, and FIG. 2B illustrates a side view of the frame structure 200 for the collapsible seat assembly 100. For example, the frame structure 200 can include a plurality of internal rigid frame members that can be at least partially disposed within the one or more pneumatic bladder members. The plurality of internal rigid frame members may include a bottom support 202 and top support 204, which are also shown in FIG. 1. For example, the one or more pneumatic bladder members can attach to the bottom support 202 and/or top support 204 to provide a fixture with respect to which the one or more pneumatic bladder members can inflate to form a contour of the seat assembly 100 in the inflated state. The bottom support 202 can provide a surface to which one or more pneumatic bladder portions are provided (e.g., to provide the base portion 102 of the collapsible seat assembly 100). The bottom support may include a cradle support portion 206 that may be at least partially disposed within one or more pneumatic bladder members to provide a cradled contour for the base portion 102. In one example, the cradle support portion 206 may be substantially free floating within the one or more pneumatic bladder members when inflated and/or may be attached to the one or more pneumatic bladder members to provide the cradled contour when inflated.

In an aspect, the one or more pneumatic bladder members may be attached to the frame structure 200 in a flexible manner. For example, an interior surface of the pneumatic bladder may be tethered to the frame structure 200 via a flexible material such that limited movement between the frame structure 200 is permitted. Further, a tether may allow the pneumatic bladder to be separated from the frame structure 200 by a limited distance when the pneumatic bladder is in an inflated state. As such, the inflated pneumatic bladder may provide cushioning of the frame structure 200 when weight of a person is applied to an external surface of the inflated pneumatic bladder. Moreover, one or more pneumatic bladder members may be defined by stitching a smaller number of pneumatic bladder members to create additional bladder portions, such to provide a shape to the seat assembly. In addition, for example, the portions may be attached using a button or zipper mechanism to define the position/shape of certain portions of the seat assembly. Moreover, in one example, the one or more pneumatic bladder members may be covered by another layer of fabric or other material to provide a shape of the seat assembly.

The plurality of internal rigid frame members may also include a support bar 208 coupled with the bottom support 202 and top support 204. In one example, the support bar 208 may be disposed entirely within the one or more pneumatic bladder members. In another example, the one or more pneumatic bladder members may not attach to the support bar, rather the support bar can connect the top support 204 to the bottom support 202 to allow connection between the top support 204 and bottom support 202, and to absorb force applied to the top support 204 with respect to the bottom support 202 and/or vice versa. In addition, the support bar 208 can provide one or more actions to allow movement of the collapsible seat assembly 100 when the one or more pneumatic bladder members are in a deflated state and/or an inflated state.

For example, support bar 208 can include one or more portions, such as a top portion 210 and a bottom portion 212 in a vertical plane 214. The support bar 208 can be collapsible such that an effective vertical length of the support bar 208 can be decreased by collapsing the support bar 208. In this regard, for example, the support bar 208 may include bistable spring action provided where the support bar 208 can be composed of a flexible metal (e.g., flexible stainless steel, carbon fiber). In this configuration, the support bar, when collapsed, can fold or roll by the bistable spring action. This may be caused by force applied manually to the support bar 208 and/or by the force/weight caused by deflating the one or more pneumatic bladder members. Conversely, with the one or more pneumatic bladder members are inflated, this may apply a pulling force to the support bar 208, which may cause the support bar 208 to snap into the extended position via the bistable spring action. When extended, the support bar 208 can support weight or force applied at least in the vertical direction 214.

The plurality of internal rigid frame members may also include one or more side supports 220 that can be disposed within the one or more pneumatic bladder members to provide side support for the one or more side panel portions 108. As described with respect to support bar 208, for example, the one or more side supports 220 may be free floating within the one or more pneumatic bladder members and/or may attach to the one or more pneumatic bladder members to enable the one or more pneumatic bladder members to provide a contour of the one or more side panel portions 108 around the one or more side supports 220. In addition, a portion of the pneumatic bladder members that provide an armrest portion 110 of the one or more side panel portions 108 can attach to the one or more side supports 220 to facilitate providing the armrest portion with respect to the one or more side supports 220 in the inflated state. Moreover, for example, the one or more side supports 220 can be foldably or collapsibly attached to the bottom support 202 (or a portion thereof) by a folding member 222, similarly to the support bar 208, to allow for collapsing the one or more side supports 220 in the vertical plane to fold over the bottom support 202. In another example, the one or more side supports 220 may be fixedly attached to the bottom support 202.

In an example, folding member 218 may provide a reclining or folding action for the seat assembly 100 (e.g., for the seatback portion 104 with respect to the base portion 102) when the one or more pneumatic bladder members of the seat assembly 100 are in an inflated state. In one example, deflation of one of the one or more pneumatic bladder members may facilitate the reclining or folding action while other ones of the one or more pneumatic bladder members remain inflated. In addition, as described further herein, deflating the one or more pneumatic bladder members may allow or cause the collapsing action of the support bar 208 to occur and/or may allow or cause folding action of the folding members 218 and/or 222 to facilitate collapsing the collapsible seat assembly 100. Similarly, for example, inflating the one or more pneumatic bladder members may cause the opposite action of the support bar 208 and/or folding members 218 and/or 222 (e.g., an extending action of the support bar 208 and/or unfolding of the folding members 218 and/or 222, etc.) by pneumatic force expanding the one or more pneumatic bladder members.

Moreover, for example, the one or more pneumatic bladder members described with reference to FIGS. 1 and 2 may include a single pneumatic bladder member to provide the base portion 102, seatback portion 104, headrest portion 106 and/or side panel portions 108, and/or may include two or more pneumatic bladder members to provide one or more of the portions.

Figure 3A:
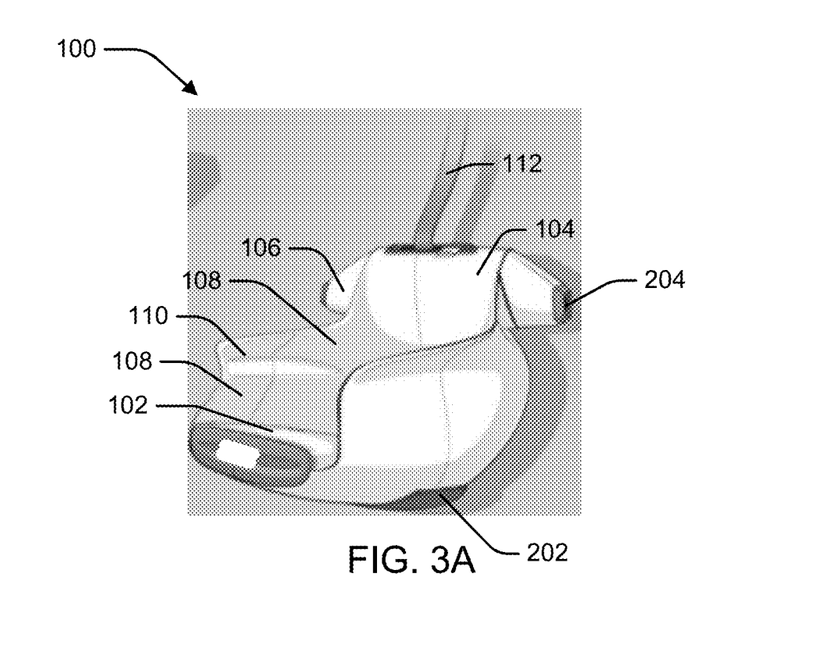
FIGS. 3A and 3B illustrate examples of a collapsible seat assembly in different collapsed or partially collapsed states in accordance with aspects of the present disclosure.

FIG. 3A illustrates a perspective view of an example of the collapsible seat assembly 100 in one or more deflated and/or collapsed states in accordance with aspects described herein. In FIG. 3A, the headrest portion 106 can be collapsed onto the seatback portion 104. For example, collapsing the headrest portion 106 may be caused by releasing the strap 112 that previously held the headrest portion 106 in place, as shown in FIG. 1. For example, the headrest portion 106 may include a flexible material or fabric piece connecting to the seatback portion 104, and may be configured to contact the seatback portion 104 when held into place by the strap 112, as shown in FIG. 1. Thus, releasing the strap 112 can cause the headrest portion 106 to fold at the flexible material or fabric piece onto the seatback portion, as shown in FIG. 3A. In another example, a pneumatic bladder member (or portion thereof) may hold the headrest portion 106 into place when inflated, and deflating this pneumatic bladder member (or portion thereof) may cause the headrest portion 106 to fold onto the seatback portion, as shown in FIG. 3A. In addition, as described above, the top support 204, to which one or more pneumatic bladder members comprising the headrest portion 106 can be attached, can be attached to the support bar 208 by a folding mechanism, to allow the top support, and thus headrest portion 106 to fold over the back of the seatback portion 104 as shown.

Figure 3B:
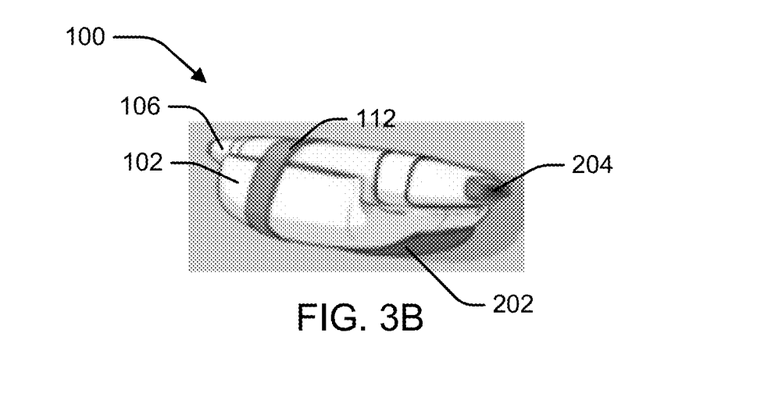

FIG. 3B illustrates a perspective view of an example of the collapsible seat assembly 100 in one or more further deflated and/or collapsed states in accordance with aspects described herein. In this collapsed state, the collapsible seat assembly 100 may be more easily transported. In FIG. 3B, the one or more pneumatic bladder members providing the seatback portion 104 and/or the base portion 102 can be deflated. In addition, without sufficient pneumatic force present in the one or more pneumatic bladder members, the support bar 208 can be collapsed and/or folded over the bottom support 202. Moreover, without sufficient pneumatic force present in the one or more pneumatic bladder members, the one or more side supports 220 can be collapsed and/or folded over the bottom support 202 as well.

In one example, the collapsing and/or folding of the various supports (e.g., supports 204, 208, and/or 220) can be caused by the deflation of the one or more pneumatic bladder members (e.g., where the pneumatic force and expansion of the one or more pneumatic bladder members in an inflated state causes extension of the supports). In this example, deflating of the one or more pneumatic bladder members can cause the one or more pneumatic bladder members to deform to a deflated state, such that pneumatic force otherwise holding the one or more pneumatic bladder members in a corresponding shape is at least partially removed, which can allow the one or more internal rigid frame members (or supports) to deform. In another example, further interaction with the seat assembly 100 may be used to collapse and/or fold the various supports as described. In one example, the strap 112 may be activated to cause the collapsing or folding action of the supports. For example, the strap 112 may be coupled to one or more spring-loaded members, and pulling the strap may cause the one or more spring-loaded members to release, resulting in collapsing and/or folding of the various supports 204, 208, and/or 220. In addition, for example, the strap 112 can be used to retain the seat assembly in the collapsed state, as shown in FIG. 3B.

In another example, the one or more pneumatic bladder members may be inflated to transform the seat assembly 100 from the deflated state shown in FIG. 3B (or FIG. 3A) into the inflated state shown in FIG. 1. As described, in one example, inflating the one or more pneumatic bladder members may cause the supports 204, 208 and/or 220 to extend to a non-collapsed state. For example, top support 204 may be attached to the one or more pneumatic bladder members, as described, and inflating the pneumatic bladder member(s) may cause the top support to extend from the bottom support 202, via the telescoping or folding action of the support bar 208. Similarly, in this example, the one or more side supports 220 may be attached to the one or more pneumatic bladder members, as described, and inflating the pneumatic bladder member(s) may cause the one or more side supports to extend from the bottom support 202. In another example, the supports 204, 208, and/or 220 may be manually extended, e.g., by pulling one or more of the supports, such as by pulling the top support 204 vertically from the bottom support 202, and then when the supports are extended, the one or more pneumatic bladder members may inflate (e.g., based on extending the supports or based on another action) to transform to the inflated state of FIG. 1.

Moreover, for example, the one or more pneumatic bladder members may have one or more associated air compressors to facilitate rapid inflation and/or deflation of the bladder members. Additionally, for example, the one or more pneumatic bladder members and/or associated air compressors may be operated by a control module to provide electronic operation of transforming the collapsible seat assembly 100 between the inflated and deflated (or collapsed) states. Moreover, such a control module for the collapsible seat assembly 100 may be operable to couple to a control module or electrical control unit (ECU) of a vehicle to allow controlling inflation/deflation (and/or collapse) of the seat assembly from the vehicle (e.g., by activating a button in the vehicle and/or interacting with an interface of a human machine interface (HMI) in the vehicle). Additionally, in one example, the plurality of internal rigid frame members may also have a control module operable to control collapsing of the members (e.g., by activating a spring-loaded mechanism, as described above). Such a control module could similarly be operated by a control module or ECU of the vehicle, in one example.

Figure 4:
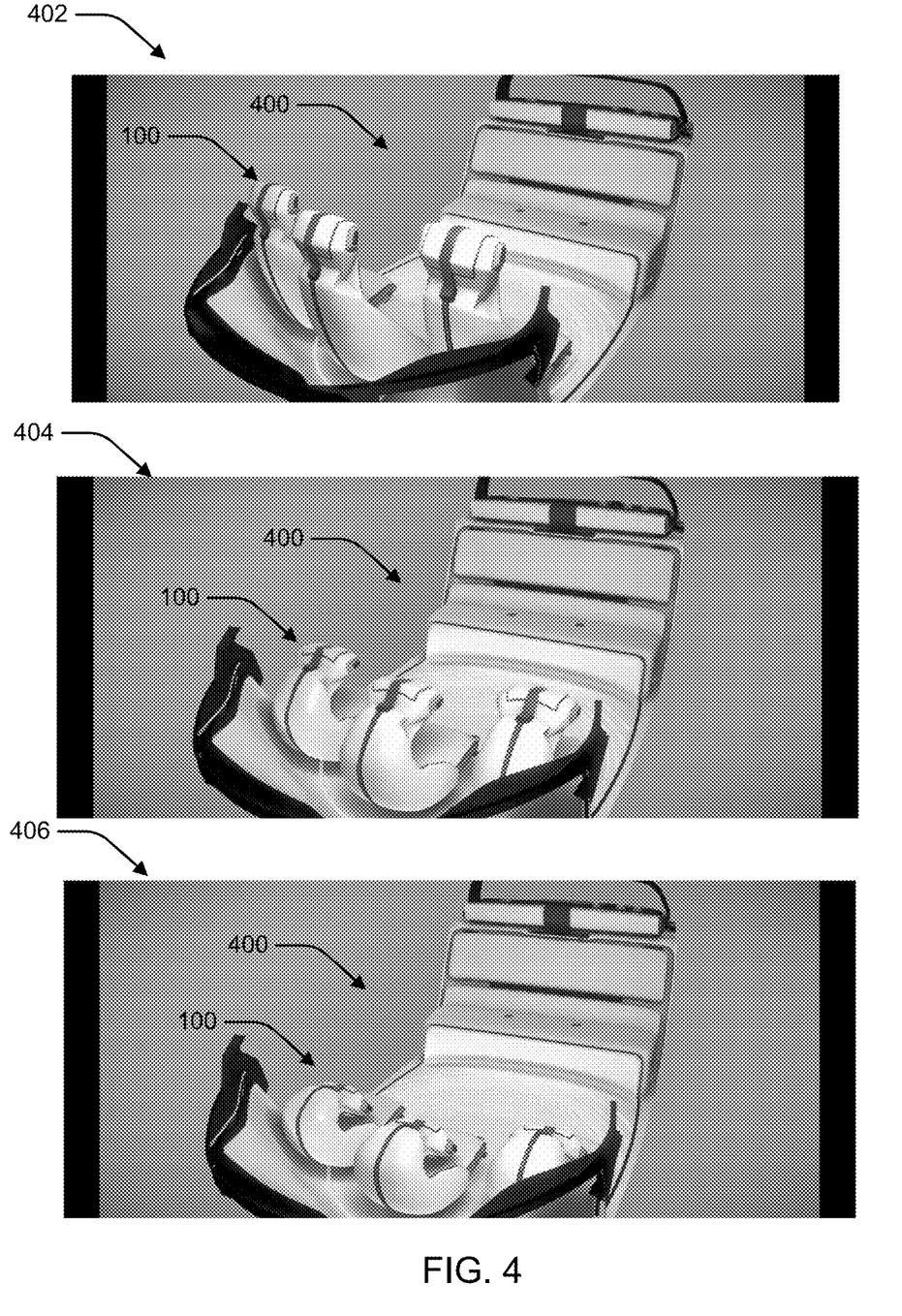
FIGS. 4 and 5 illustrate examples of collapsible seat assemblies disposed in a vehicle in accordance with aspects of the present disclosure.
Figure 5:
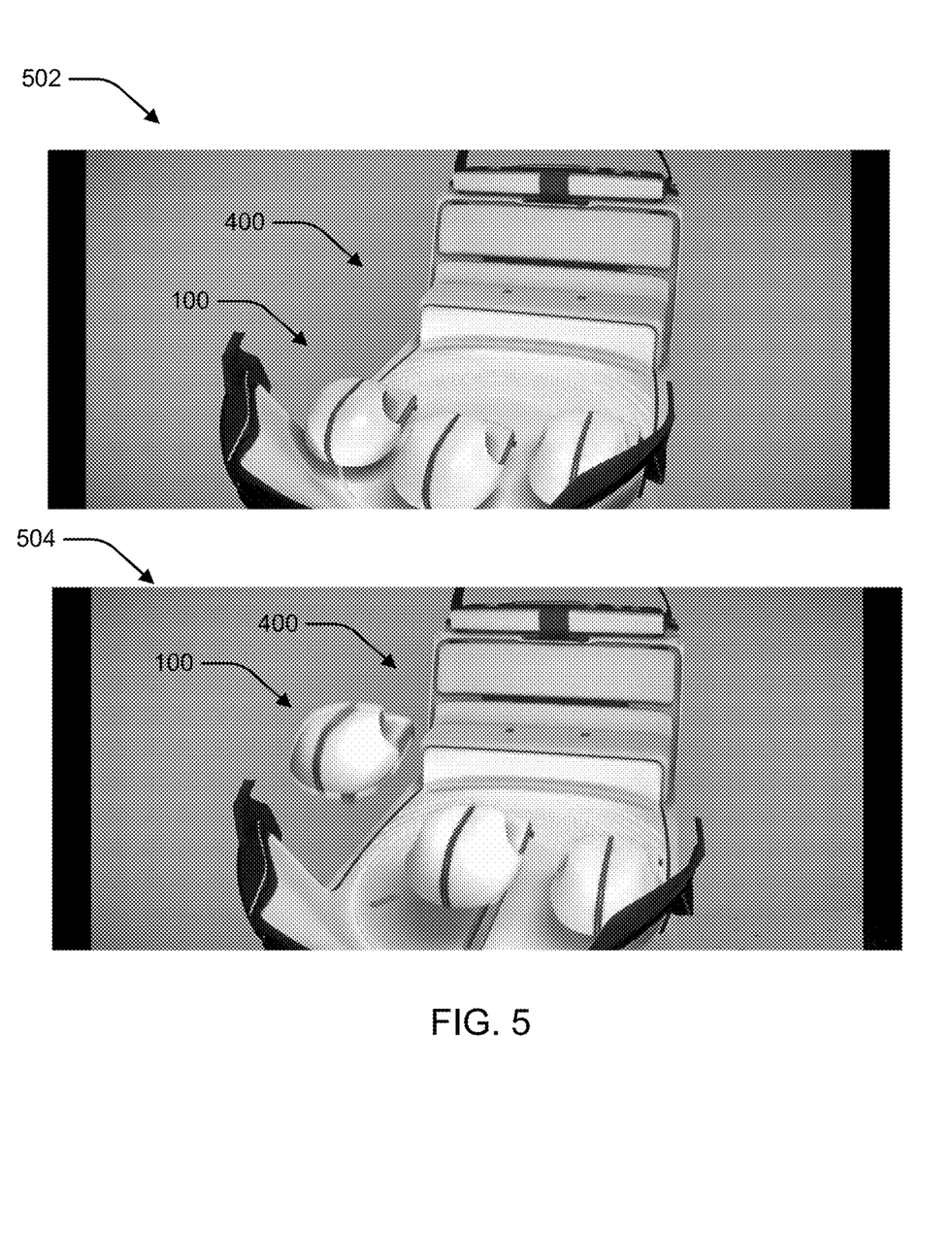

FIGS. 4 and 5 illustrate examples of configurations of collapsible seat assemblies 100 positioned within an interior 400 of a vehicle. For example, configuration 402 depicts seat assemblies 100 disposed within the interior 400 of the vehicle and in an inflated state.

For example, configuration 404 depicts seat assemblies 100 disposed within the interior 400 of the vehicle and in a partially deflated state where the seatback portion is partially deformed due to partially deflating one or more pneumatic bladder members. Additionally, in configuration 404, the support bar can be in a partially collapsed state resulting in decreasing the length of the seat assemblies in a vertical plane.

For example, configuration 406 depicts seat assemblies 100 disposed within the interior 400 of the vehicle and in a further partially deflated state where the seatback portion is further partially deformed due to further partially deflating one or more pneumatic bladder members. Additionally, in configuration 406, the support bar can be in a further partially collapsed state resulting in further decreasing the length of the seat assemblies in a vertical plane. In one example, the support bar may be in a completely collapsed state.

For example, configuration 502 depicts seat assemblies 100 disposed within the interior 400 of the vehicle and in a partially deflated state where the seatback portion is partially deformed due to partially deflating one or more pneumatic bladder members. In one example, this can be a completely deflated state when the support bar is completely deformed such that the seatback portion is folded onto the base portion. In addition, in this configuration 502, the headrest portion is in a collapsed state and folded onto the front of the seatback portion.

For example, configuration 504 depicts removal of one of the seat assemblies 100 in its deflated and/or collapsed state.

In an example, the configurations 402, 404, 406, 502, 504 can show deflation/collapse (and/or removal) of the seat assemblies 100 over a period of time. In another example, the seat assemblies 100 may be installed and inflated, which may be represented by a reverse order of the configurations 402, 404, 406, 502, 504.

Figure 6:
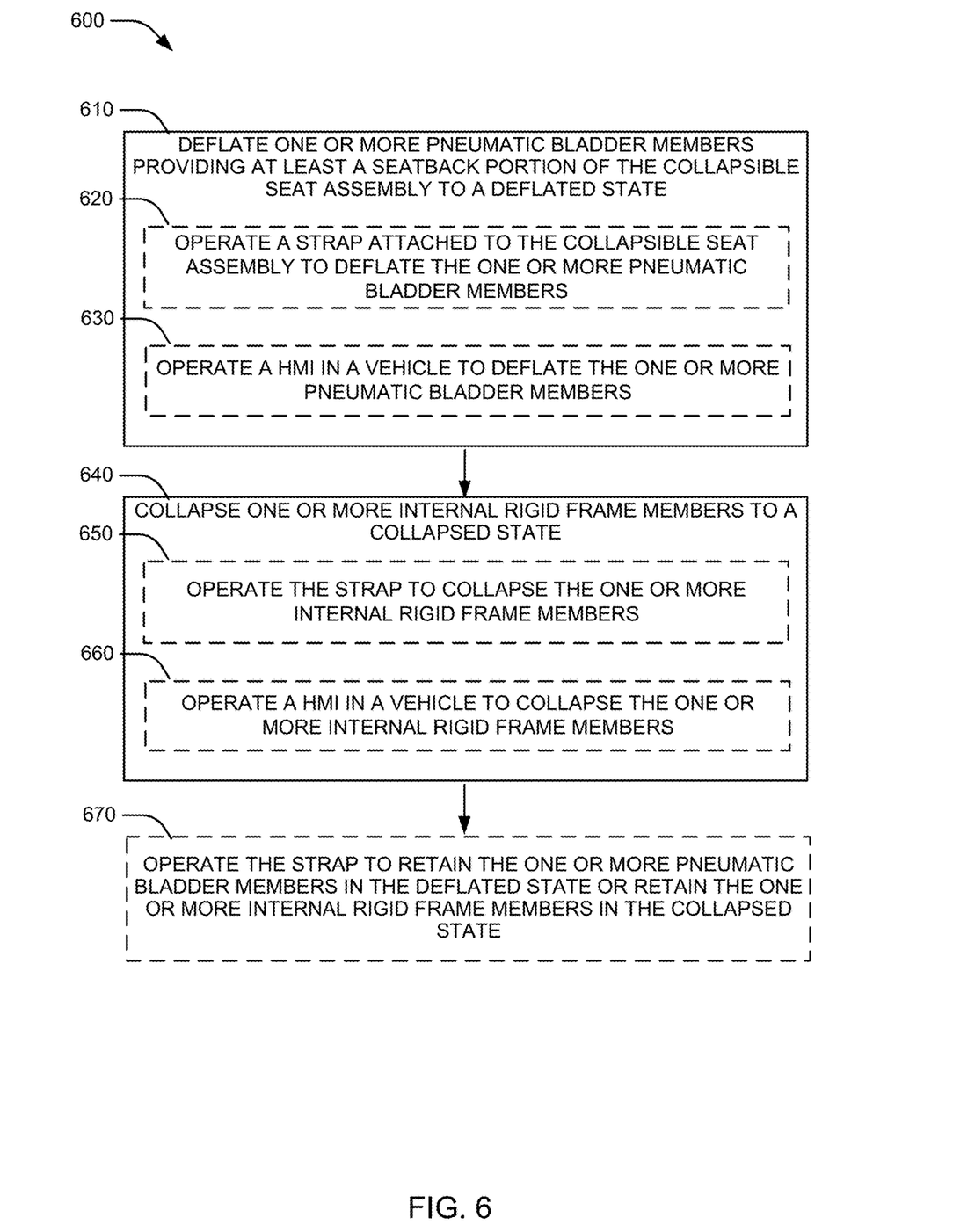
FIG. 6 illustrates an example of a method for collapsing a collapsible seat assembly in accordance with aspects of the present disclosure.

FIG. 6 illustrates a flowchart of an example method 600 for controlling deflation and/or collapse of a collapsible seat assembly. The method 600 may be performed by a person and/or by activating a strap of the collapsible seat assembly or by an ECU of a vehicle, etc.

In block 610, the method 600 may include deflating one or more pneumatic bladder members providing at least a seatback portion of the collapsible seat assembly to a deflated state. In an aspect, for example, this may include operating an associated air compressor to remove air from the one or more pneumatic bladder members.

In addition, for example, deflating the one or more pneumatic bladder members at block 610 may optionally include, at block 620, operating a strap attached to the collapsible seat assembly to deflate the one or more pneumatic bladder members. As described, operating the strap may cause activation of an air compressor or other mechanism to deflate the one or more pneumatic bladder members. Similarly, deflating the one or more pneumatic bladder members at block 610 may optionally include, at block 630, operating a HMI in a vehicle to deflate the one or more pneumatic bladder members.

In block 640, the method 600 may include collapsing one or more internal rigid frame members to a collapsed state. In an aspect, for example, this may include operating associated spring mechanisms (e.g., a bistable spring), and/or mechanical, electrical, or electromechanical mechanism coupled to the spring mechanisms, to collapse the one or more internal rigid frame members.

In addition, for example, collapsing the one or more internal rigid frame members at block 640 may optionally include, at block 650, operating the strap to collapse the one or more internal rigid frame members. As described, operating the strap may cause activation of the spring mechanism (and/or of coupled mechanical, electrical, or electromechanical members) to collapse the one or more internal rigid frame members. Similarly, collapsing the one or more internal rigid frame members at block 640 may include, at block 660, operating a HMI in a vehicle to collapse the one or more internal rigid frame members.

Moreover, in one example, the one or more internal rigid frame members may collapse based on deflation of the one or more pneumatic bladder members, such that the one or more internal rigid frame members are extended to and/or remain in an extended, e.g., non-collapsed, state based on pneumatic pressure of the one or more pneumatic bladder members.

In block 670, the method 600 may optionally include operating the strap to retain the one or more pneumatic bladder members in the deflated state or retain the one or more internal rigid frame members in the collapsed state. For example, this may include wrapping the strap around one or more of the deflated pneumatic bladder members, as shown in FIG. 3B.

In addition, the one or more pneumatic bladder members can be similarly inflated and/or the one or more internal rigid frame members can be extended from the collapsed state. For example, the one or more pneumatic bladder members can be inflated by activating an associated air compressor and/or the one or more internal rigid frame members can be extended by activating an associated folding mechanism (or inflating the one or more pneumatic bladder members may cause extending of the one or more internal rigid frame members), etc., which may also be controlled by the strap, by the HMI in the vehicle, and/or the like.

Figure 7:
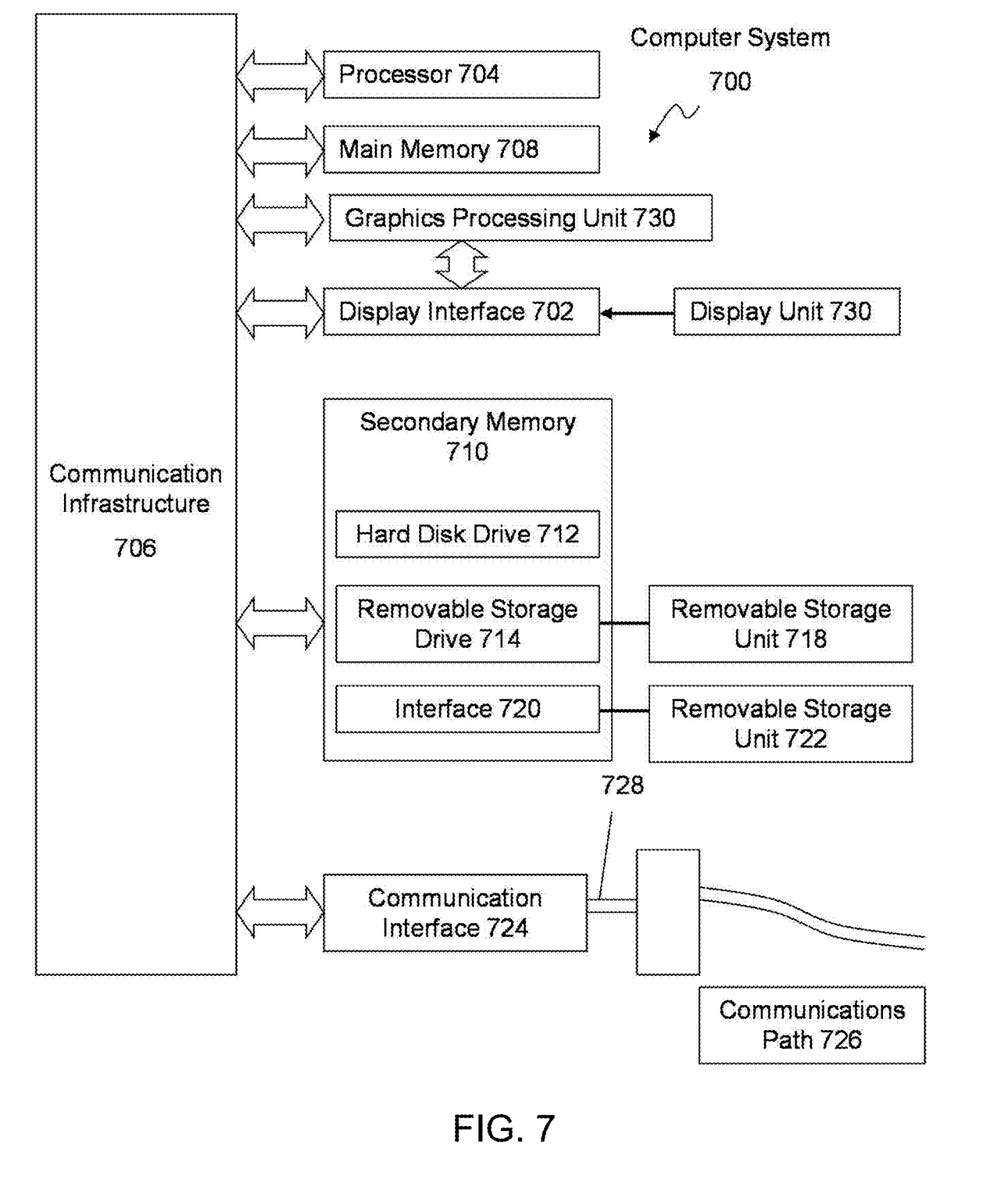
FIG. 7 presents an exemplary system diagram of various hardware components and other features for use in accordance with aspects of the present disclosure.

Aspects of the present disclosure, such as one or more control modules for controlling inflation/deflation of pneumatic bladder members or collapsing/extending of one or more internal rigid frame members may be implemented using hardware, software, or a combination thereof and may be implemented in one or more computer systems or other processing systems. In one aspect, the disclosure is directed toward one or more computer systems capable of carrying out the functionality described herein. FIG. 7 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 780, a hard disk installed in hard disk drive 770, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard disk drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 8:
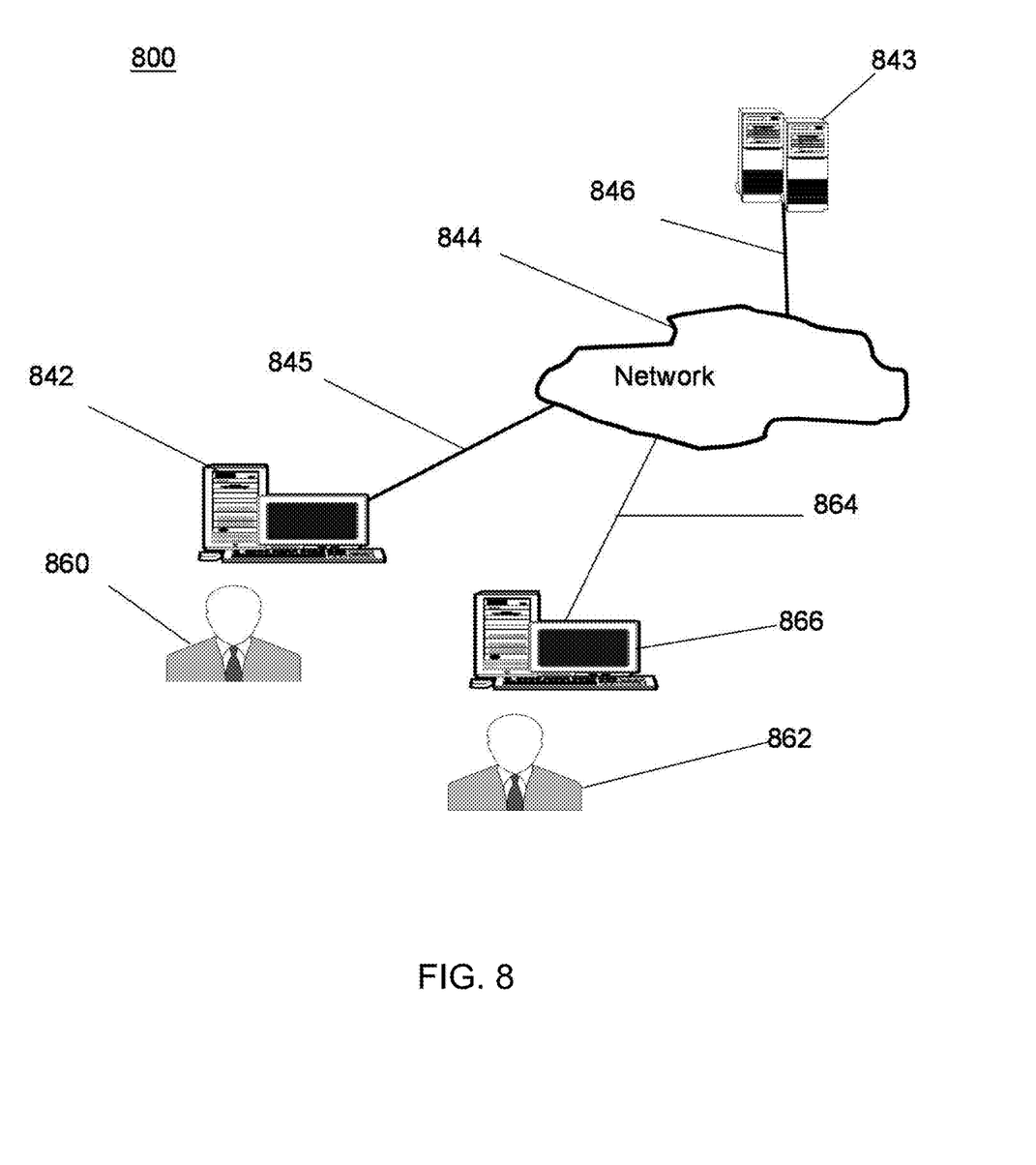
FIG. 8 is a block diagram of various exemplary system components for use in accordance with aspects of the present disclosure.

FIG. 8 is a block diagram of various example system components that may be used in accordance with aspects of the present disclosure. For example, the various components may be within a vehicle (e.g., to provide a control module for collapsible seat assemblies 100, HMI for controlling the collapsible seat assemblies 100, etc.), or only some of the components may be within the vehicle, and other components may be remote from the vehicle. The system 800 includes one or more accessors 860, 862 (also referred to interchangeably herein as one or more "users") and one or more terminals 842, 866 (such terminals may be or include, for example, various features of the collapsible seat assemblies 100 or related control modules). In one aspect, data for use in accordance with aspects of the present disclosure is, for example, input and/or accessed by accessors 860, 862 via terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, for example, a network 844, such as the Internet or an intranet, and couplings 845, 846, 864. The couplings 845, 846, 864 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A collapsible seat assembly, comprising:
one or more pneumatic bladder members providing, in an inflated state, at least a base portion and a seatback portion of the collapsible seat assembly; and
a plurality of internal rigid frame members each disposed at least partially within a first bladder of the one or more pneumatic bladder members, wherein at least a portion of the one or more pneumatic bladder members attach to at least a portion of the plurality of internal rigid frame members to provide a support for the one or more pneumatic bladder members,
wherein the plurality of internal rigid frame members include a bottom support, a top support, and a support bar attached by a pivotal attachment to at least one of the bottom support and the top support within the first bladder,
wherein the support bar is collapsible to collapse to a decreased vertical length in a collapsed state when the one or more pneumatic bladder members are in a deflated state,
wherein the support bar is collapsible by a telescoping action within the first bladder to the decreased vertical length of the support bar when the one or more pneumatic bladder members are in the deflated state, and
wherein the support bar is collapsible to fold relative to at least one of the bottom support or the top support at the pivotal attachment in a collapsed state when the one or more pneumatic bladder members are in a deflated state.

2. The collapsible seat assembly of claim 1, wherein at least one of the bottom support and the top support attach to the one or more pneumatic bladder members, and wherein the support bar is disposed within, and does not attach to, the one or more pneumatic bladder members.

3. The collapsible seat assembly of claim 1, wherein the support bar is configured to be folded over the bottom support when the support bar is in the collapsed state.

4. The collapsible seat assembly of claim 1, wherein the plurality of internal rigid frame members include one or more side supports attached to the bottom support, wherein the one or more side supports are configured to fold from the bottom support to form side panel portions of the collapsible seat assembly.

5. The collapsible seat assembly of claim 4, wherein the bottom support attaches to the one or more pneumatic bladder members, and wherein the one or more side supports do not attach to the one or more pneumatic bladder members.

6. The collapsible seat assembly of claim 4, wherein the one or more side supports are fixedly attached to the bottom support.

7. The collapsible seat assembly of claim 4, wherein the one or more side supports are foldably attached to the bottom support.

8. The collapsible seat assembly of claim 4, wherein the one or more side supports are foldable to fold over the bottom support when the one or more pneumatic bladder members are in a deflated state.

9. The collapsible seat assembly of claim 1, wherein one or more of the plurality of internal rigid frame members are collapsible to a collapsed state by a telescoping action when at least one of the one or more pneumatic bladder members are in a deflated state, and further comprising a strap configured to retain the one or more of the plurality of internal rigid frame members in the collapsed state.

10. The collapsible seat assembly of claim 9, wherein the strap is connected to a control module configured to at least one of cause the one or more pneumatic bladder members to deflate to the deflated state, or cause the one or more of the plurality of internal rigid frame members to telescope to the collapsed state.

11. The collapsible seat assembly of claim 1, wherein one or more of the plurality of internal rigid frame members are foldable to a collapsed state when at least one of the one or more pneumatic bladder members are in a deflated state, and further comprising a strap configured to retain the one or more of the plurality of internal rigid frame members in the collapsed state.

12. The collapsible seat assembly of claim 11, wherein the strap is configured to at least one of cause the one or more pneumatic bladder members to deflate to the deflated state, or cause the one or more of the plurality of internal rigid frame members to fold to the collapsed state.

13. A vehicle, comprising:
a plurality of collapsible seat assemblies, wherein each of the plurality of collapsible seat assemblies include:
one or more pneumatic bladder members providing, in an inflated state, at least a base portion and a seat-back portion of the collapsible seat assembly; and
a plurality of internal rigid frame members each disposed at least partially within a first bladder of the one or more pneumatic bladder members, wherein at least a portion of the one or more pneumatic bladder members attach to at least a portion of the plurality of internal rigid frame members to provide a support for the one or more pneumatic bladder members,
wherein the plurality of internal rigid frame members include a bottom support, a top support, and a support bar attached by a pivotal attachment to at least one of the bottom support and the top support within the first bladder,
wherein the support bar is collapsible to collapse to a decreased vertical length in a collapsed state when the one or more pneumatic bladder members are in a deflated state,
wherein the support bar is collapsible by a telescoping action within the first bladder to the decreased vertical length of the support bar when the one or more pneumatic bladder members are in the deflated state, and
wherein the support bar is collapsible to fold relative to at least one of the bottom support or the top support at the pivotal attachment in a collapsed state when the one or more pneumatic bladder members are in a deflated state;
one or more air compressors operable to inflate or deflate the one or more pneumatic bladder members; and
a control module configured to control the one or more air compressors to inflate or deflate the one or more pneumatic bladder members of one or more of the plurality of collapsible seat assemblies.

14. The vehicle of claim 13, wherein at least one of the bottom support and the top support attach to the one or more pneumatic bladder members, and wherein the support bar is disposed within, and does not attach to, the one or more pneumatic bladder members.

15. The vehicle of claim 13, wherein the support bar is configured to be folded over the bottom support when the support bar is in the collapsed state.

16. The vehicle of claim 13, wherein the plurality of internal rigid frame members include one or more side supports attached to the bottom support, wherein the one or more side supports are configured to fold from the bottom support to form side panel portions of the collapsible seat assembly.

17. The vehicle of claim 16, wherein the bottom support attaches to the one or more pneumatic bladder members, and wherein the one or more side supports do not attach to the one or more pneumatic bladder members.

18. The vehicle of claim 16, wherein the one or more side supports are fixedly attached to the bottom support.

19. The vehicle of claim 16, wherein the one or more side supports are foldably attached to the bottom support.

20. The vehicle of claim 16, wherein the one or more side supports are foldable to fold over the bottom support when the one or more pneumatic bladder members are in a deflated state.

21. The vehicle of claim 13, wherein one or more of the plurality of internal rigid frame members are collapsible to a collapsed state by a telescoping action when at least one of the one or more pneumatic bladder members are in a deflated state, and wherein each of the plurality of collapsible seat assemblies further comprise a strap configured to retain the one or more of the plurality of internal rigid frame members in the collapsed state.

22. The vehicle of claim 13, wherein one or more of the plurality of internal rigid frame members are foldable to a collapsed state when at least one of the one or more pneumatic bladder members are in a deflated state, and wherein each of the plurality of collapsible seat assemblies further comprise a strap configured to retain the one or more of the plurality of internal rigid frame members in the collapsed state.

* * * * *